United States Patent
Wade, III et al.

(10) Patent No.: US 7,098,398 B2
(45) Date of Patent: Aug. 29, 2006

(54) ADJUSTABLE SPRING GROUNDING PIN

(75) Inventors: Clifton Wade, III, Florissant, MO (US); L. Ranney Dohogne, St. Louis, MO (US); William R. Lewis, Hazelwood, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/921,570

(22) Filed: Aug. 19, 2004

(65) Prior Publication Data

US 2006/0037770 A1  Feb. 23, 2006

(51) Int. Cl.
*H05K 5/02* (2006.01)

(52) U.S. Cl. .................... 174/51; 174/6; 174/78; 439/92; 439/98

(58) Field of Classification Search ............ 174/6, 174/51, 78, 40 CC; 439/98, 100, 92
See application file for complete search history.

(56) References Cited

U.S. PATENT DOCUMENTS 3,971,609 A * 7/1976 Knecht ............... 439/102
6,283,770 B1 * 9/2001 Leung et al. ......... 439/92

* cited by examiner

*Primary Examiner*—Dhiru R. Patel
(74) *Attorney, Agent, or Firm*—Thompson Coburn, LLP

(57) ABSTRACT

An adjustable spring grounding pin for grounding separate parts of an electrical device, for example end shields and a stator of an electric motor, automatically adjusts its circumferential dimension to provide a tight grounding fit between aligned holes of different interior diameters in the end shields and the stator of the device as the grounding pin is driven into the aligned holes.

15 Claims, 3 Drawing Sheets

ADJUSTABLE SPRING GROUNDING PIN

BACKGROUND OF THE INVENTION (1) Field of the Invention

The present invention pertains to an adjustable spring grounding pin for grounding three separate parts of an electrical device, for example two end shields and a stator of an electric motor. In particular, the invention pertains to a grounding pin that automatically adjusts its circumferential dimension to provide a tight grounding fit between aligned holes of different interior diameters in end shields and a stator of an electrical device as the grounding pin is driven into the aligned holes.

(2) Description of the Related Art

An electrical device such as an electric motor typically includes the basic component parts of a stator, a pair of end shields mounted over axially opposite ends of the stator, and a rotor. The rotor is positioned in a center bore of the stator with opposite ends of the rotor shaft being mounted for rotation in bearings or bushings in the opposite end shields of the motor.

FIG. 1 shows the basic construction of an electric motor of the type commonly used in household appliances. The motor is comprised of the pair of end shields 12, 14 containing the stator 16. The rotor (not shown) is positioned inside the stator 16 and the end shields 12, 14 support the opposite ends of the rotor shaft 18. On the particular motor shown, each of the end shields 12, 14 has four legs 22, 24 that extend over the peripheral edges of the stator laminations. The distal ends of the legs are secured together by adhesive or by other equivalent means.

Where motors of the type shown in FIG. 1 are employed in household appliances such as dishwashers, clothes washers and clothes dryers, it is very important that the electric motor be properly grounded to protect users of the appliance. One of the motor end shields 12, 14 is usually provided with a ground terminal that is electrically connected to a ground connection of the appliance. The ground connection of the appliance in turn is grounded through a three-prong outlet plug or through a separate ground, for example a ground connection to a cold water pipe of the household.

Component parts of the motor, i.e., the end shields 12, 14 and the stator 16 are often ground connected together by a ground pin 26 that is received in aligned holes in the stator and the end shields. The prior art ground pin 26 is a conductive pin of solid metal having a cylindrical exterior surface and flat circular end surfaces. The pin is usually constructed of a harder metal than that of the end shields and stator laminations to enable the pin to be driven into the stator hole without bending the pin. The ground pin 26 is often installed by first drilling or reaming holes through the soft metal of the end shield legs 22, 24 and into the harder metal of the laminations of the stator 16. To provide grounding contact with both end shields, the grounding pin hole 28 is usually drilled between mating surfaces of the legs, as shown in FIG. 1. The pin 26 would then be manually pressed or hammered into the aligned holes.

This prior art method of grounding motor parts was found to be disadvantaged in that, because the metal of the end shields, and in particular the end shield legs 22, 24, is usually softer than the metal of the laminations of the stator 16, when the hole is formed through the end shield legs and into the stator it would often result in the hole 28 through the end shield legs being slightly larger than the hole 32 formed in the stator. This would occur due to the material of the end shield legs being softer than the material of the stator laminations, and also due to the positioning of the ground pin hole, the hole being drilled through the two mating surfaces of the end shield legs and then into the stator. The dimension of the hole 32 drilled into the stator would be chosen to provide a tight friction fit of the ground pin 26 in the stator hole. If the hole 28 through the end shield legs is larger than the stator hole 32 by 0.006 of an inch, with the ground pin outer diameter being sized to fit tightly into the interior diameter of the stator hole, it is possible that the ground pin would not make contact with the end shield legs or would only make sufficient grounding contact with one of the end shield legs, resulting in the motor not being grounded or only one end shield of the motor being grounded with the possibility of the opposite end shield being live. In order for the motor to have a proper ground, the ground pin 26 must make contact with the stator and both end shields at all times.

SUMMARY OF THE INVENTION

The ground pin of the present invention overcomes the disadvantages associated with the prior art ground pin by providing an adjustable spring ground pin that is designed to fit in tight friction engagement in both the stator hole and the hole of the end shields, even when these holes are of different diameters. This is accomplished by the novel construction of the subject ground pin.

The pin has a cylindrical exterior surface that extends longitudinally between opposite first and second end faces of the pin, and a hollow interior bore extending through the center of the pin from the first end face to the second end face. The exterior surface of the pin has an outer diameter that is dimensioned to fit in tight friction engagement with the hole drilled through the end shields of the motor, even when that hole is slightly larger than the hole drilled into the stator of the motor. The construction of the pin center bore allows the opposite ends of the pin to contract or collapse radially inwardly independently of each other. With this construction, when the stator hole is smaller than the hole of the end shields, the end of the pin driven into the stator hole will collapse to a greater extent than the end of the pin that remains in the hole of the end shields. In this manner, both ends of the pin of the invention engage in a tight friction engagement with the stator hole and the hole of the end shields, and the pin provides a proper ground between the separate component parts of the motor.

The exterior surface of the pin is provided with a plurality of protrusions. The protrusions are formed as either longitudinally extending splines extending over the exterior of the pin, or pairs of longitudinally spaced bumps on the exterior surface of the pin. The protrusions insure a proper grounding connection of the pin with the stator and the end shields when the pin is installed in the stator and end shield holes.

A longitudinally extending slot is formed in the pin from its exterior surface through to the pin center bore. The slot intersects the opposite end faces of the pin. The slot gives the pin a cross section resembling a c-spring. The slot, together with the hollow center bore of the pin enables the pin to collapse on itself as it is driven through the hole of the end shields and into the hole of the stator.

In the preferred embodiment, a transverse notch is also formed into the exterior surface of the pin intermediate the opposite end faces of the pin. The notch extends across the longitudinal slot of the pin and intersects the pin center bore. The notch isolates the longitudinally opposite ends of the pin and prevents the collapsing of the pin end driven into the stator hole from influencing the collapsing of the pin end driven into the hole of the end shields.

By constructing the adjustable spring grounding pin of the invention in the manner described above, the pin insures a proper grounding connection between the stator and the end shields of the motor when the pin is driven through the hole of the end shields and into a smaller stator hole.

BRIEF DESCRIPTION OF THE DRAWINGS

Further objects and features of the invention are revealed in the following detailed description of the preferred embodiment of the invention and in the drawing figures wherein.

DETAILED DESCRIPTION OF THE PREFERRED EMBODIMENT

Figure 1:
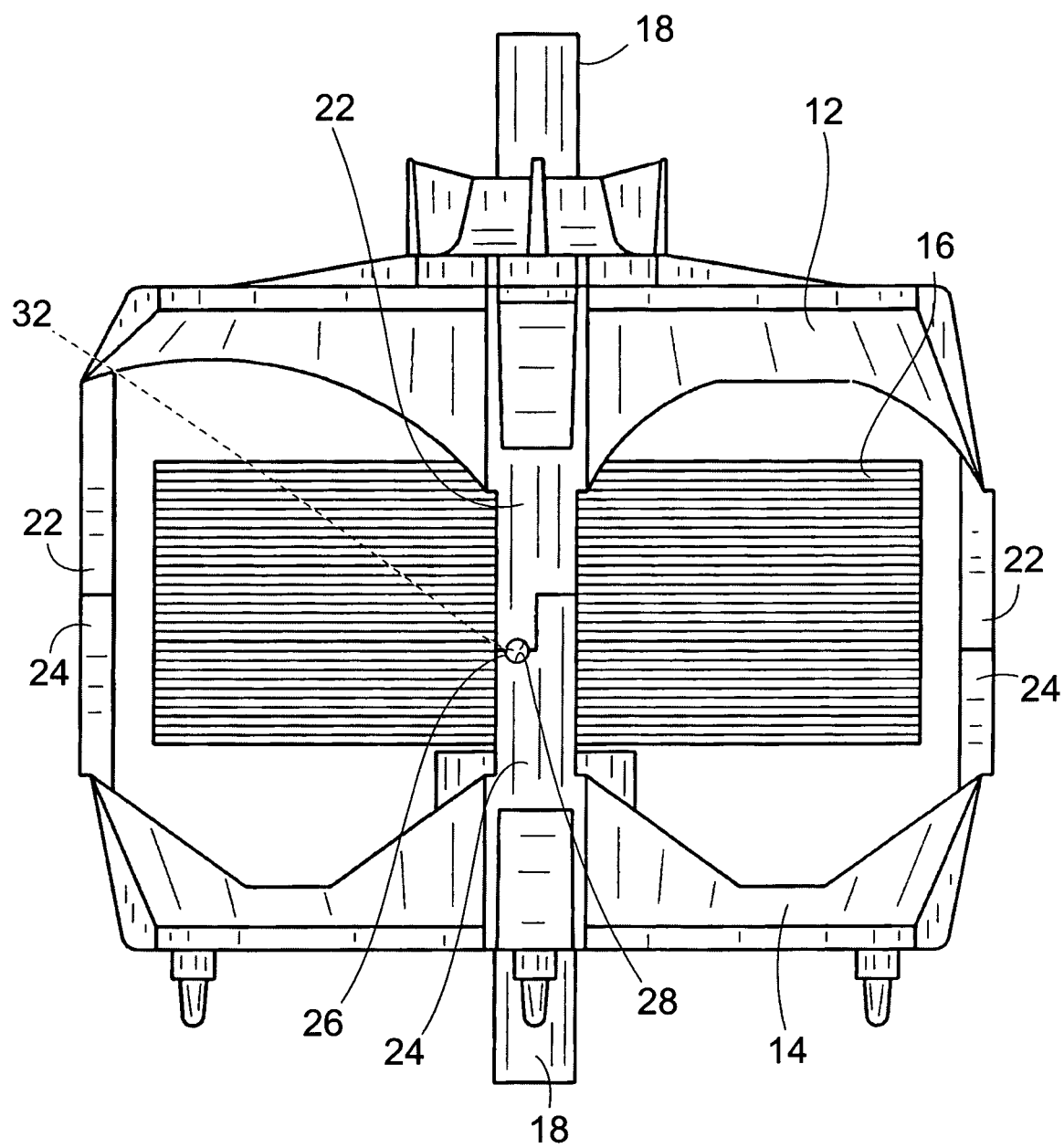
FIG. 1 is a side view of a prior art electric motor showing a grounding pin driven through the end shield legs of the motor and into the stator of the motor.
Figure 2:
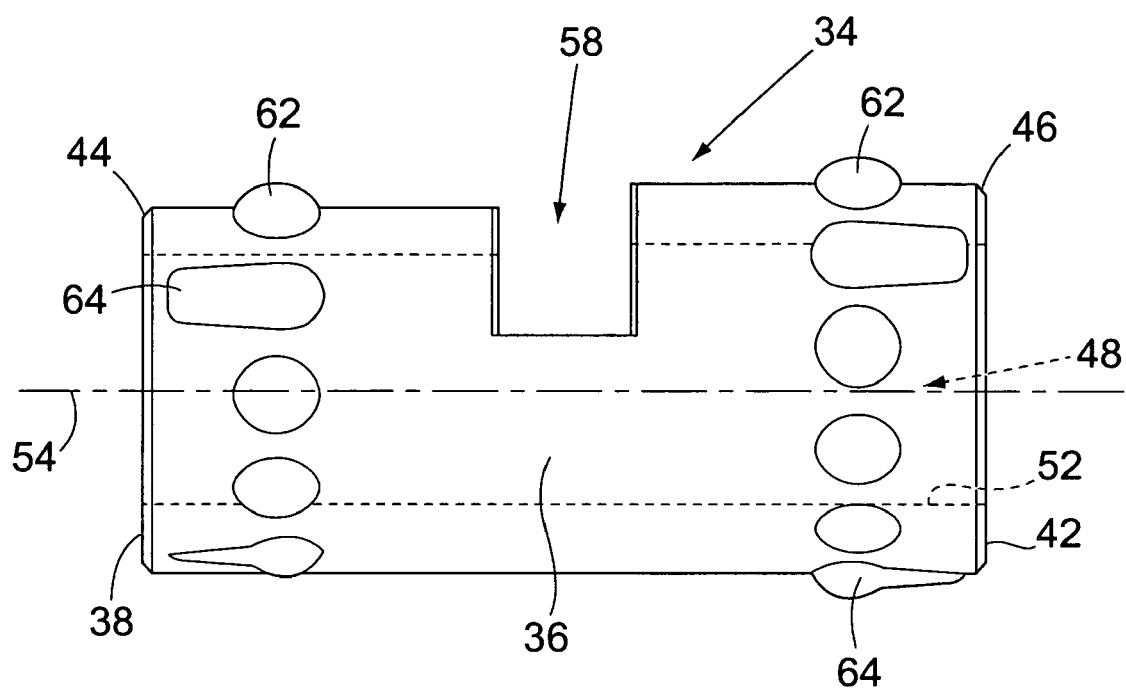
FIG. 2 is a side elevation view of the grounding pin of the invention.
Figure 3:
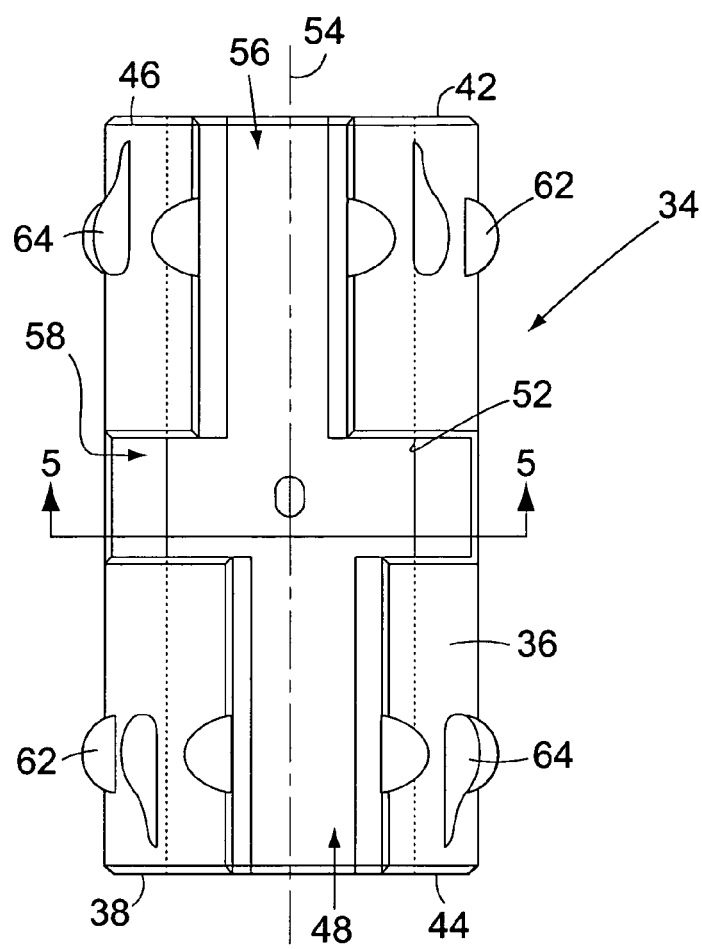
FIG. 3 is a top plane view of the grounding pin.

FIGS. 2 and 3 show respective side and top views of the grounding pin 34 of the invention. In the preferred embodiment, the pin is constructed of a metal having a hardness that is greater than that of the laminations of the stator into which the pin is to be driven. The metal of the grounding pin is also harder than the metal employed in forming the end shields of the motor. Preferably, the metal is spring steel.

The grounding pin 34 is constructed with a cylindrical exterior surface 36 that extends longitudinally between axially opposite first 38 and second 42 end faces of the pin. The exterior diameter of the pin is determined to provide a tight friction engagement with the hole to be drilled into the end shields and stator laminations of the motor (not shown) with which the pin is used. The pin is formed with tapered portions 44, 46 adjacent the opposite end faces 38, 42 of the pin. The tapered portions are provided to assist in aligning the pin with the holes of the end shields and the stator, and in initially driving the pin into the aligned holes.

A hollow center bore 48 passes longitudinally through the interior of the pin and intersects the first end face 38 and the second end face 42. The center bore 48 is defined by a cylindrical interior surface 52 and has a center axis 54.

A longitudinal slot 56 is formed into the exterior surface 36 of the pin and passes completely through the pin to its interior surface 52. The slot 56, by intersecting the pin interior bore 48, effectively extends to the center axis 54 of the pin. A variant embodiment of the pin could include a center bore that does not have a cylindrical interior surface, but is defined by the parallel, opposed side walls of the slot. The slot 56 extends the entire longitudinal length of the pin and intersects the first end face 38 and the second end face 42. As seen in FIG. 3, the slot 56 is comprised of two sections that are slightly, axially misaligned. The pin center bore 48 and the slot 56 give the length of the pin a cross section resembling that of a c-spring. The presence of the slot 56 through the pin enables the axially opposite ends of the pin to contract or collapse radially inwardly.

A transverse notch 58 is also formed into the pin exterior surface 36 and extends through to the pin interior surface 52 intersecting the pin center bore 48. As seen in FIG. 2, the notch 58 is positioned in the pin intermediate the first end face 38 and second end face 42, and partially bisects the pin to the extent that it intersects the center axis 54 of the pin center bore. The extent to which the notch 58 extends across the pin isolates the opposite ends of the pins from each other. This enables the contraction or collapsing of a first end of the pin adjacent the first end face 38 to occur without influencing the contraction or collapsing of the second end of the pin adjacent the second end face 42, and vice versa. If the transverse notch 58 were not present in the pin, when the first end of the pin adjacent the first end face 38 is driven through the hole of the end shields and into the stator hole, the contraction or collapsing of the pin first end radially inwardly would have a tendency to contract or collapse the opposite second end of the pin to a certain extent. However, with the presence of the transverse notch 58, the extent to which the first end of the pin adjacent the first end face 38 contracts or collapses as it is driven into the stator hole will have no influence on the second end of the pin adjacent the second end face 42. Thus, with the exterior surface 36 of the pin being dimensioned to be sufficiently large to provide a tight friction fit in the larger hole of the end shields, the first end of the pin adjacent the first end face 38 can be contracted and collapsed radially inwardly to a greater extent as it is driven into the stator hole than the second end of the pin adjacent the second end face 42, which remains in a tight friction fit in the hole of the end shields.

Figure 4:
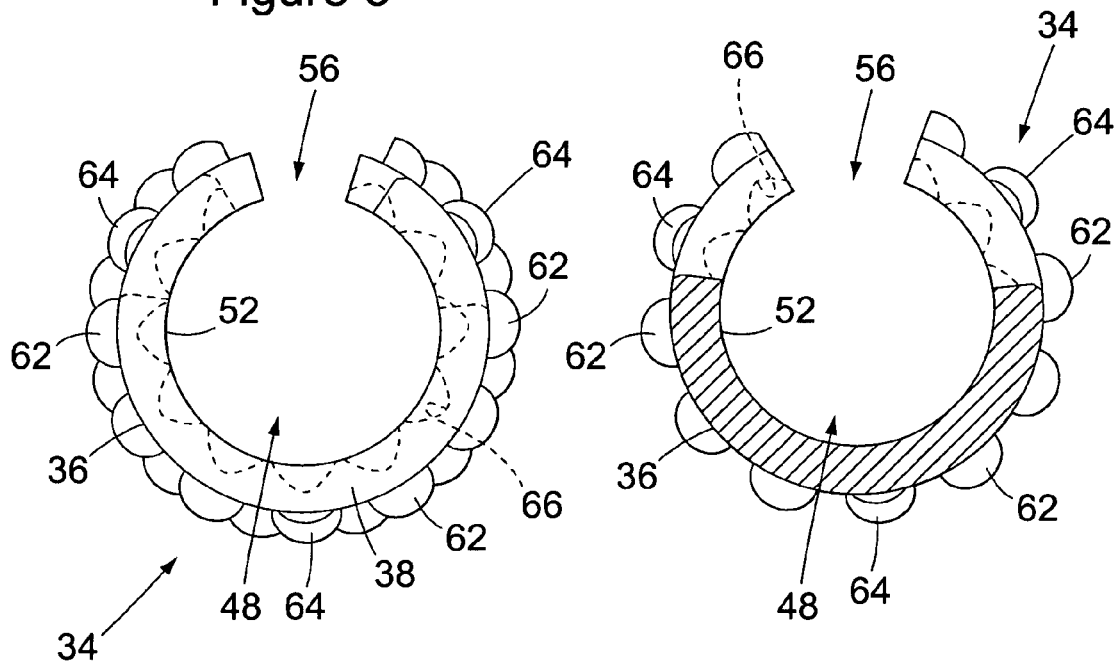
FIG. 4 is an end view of the grounding pin.
Figure 5:
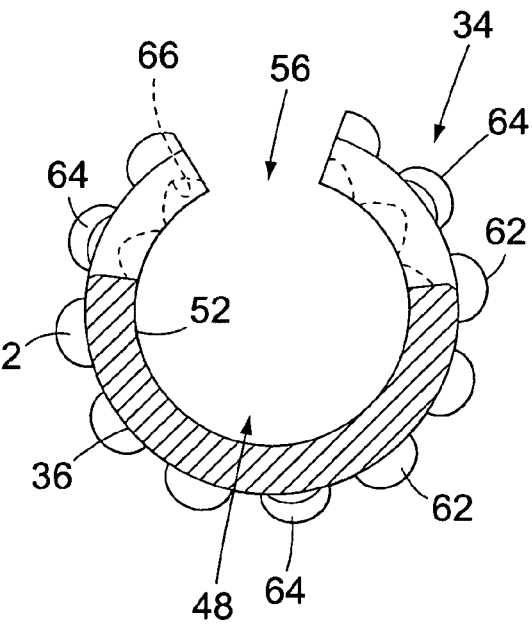
FIG. 5 is a cross section of the grounding pin in the plane of line 5—5 of FIG. 3; and, FIG. 6 is a partial cross section of the grounding pin length.

A plurality of projections are provided on the exterior surface of the pin 34. The projections 62, 64 enhance the tight friction fit of the opposite ends of the pin in the aligned holes of the motor end shields and stator when the pin is driven into the aligned holes. A plurality of the projections are formed as circular bumps 62 and a plurality of the projections are formed as axially tapered splines 64. The tapered splines 64 provide a temporary fixturing of the pin 34 in the drilled hole of the motor end shields prior to driving the pin completely into the hole. Without the splines 64 the pin 34 would have a tendency to fall out of the end shield's hole before it can be driven into the hole. This is because the base diameter of the pin 34 is often smaller than the interior diameter of the drilled hole. As seen in FIGS. 2 through 3, pairs of longitudinally spaced bumps 62 and pairs of longitudinally spaced spline 64 are axially misaligned with each other on the exterior surface 36 of the pin. Looking at FIG. 3, the bumps 62 and splines 64 adjacent the first end face 38 of the pin are moved slightly to the right relative to the bumps 62 and splines 64 adjacent the second end face 42 of the pin. Looking at FIG. 4, the bumps 62 and splines 64 adjacent the pin first end face 38 are spaced circumferentially around the exterior surface 36 of the pin from the bumps 62 and splines 64 adjacent the pin second end face 42. This particular arrangement of the pairs of longitudinally spaced bumps 62 and splines 64 enhances the ability of the pin to fit in a tight friction engagement in the aligned holes of the motor end shields and the stator when the pin is driven into the aligned holes. With the first end face 38 being first driven into the holes 28 through the end shield legs 22, 24, the bumps 62 and splines 64 adjacent the first end face 38 would have a tendency to form grooves through the softer material of the end shield legs as the bumps 62 and splines 64 pass through the end shields hole 28. If the bumps 62 and splines 64 were axially aligned on the exterior surface 36, the bumps 62 and splines 64 adjacent the second end face 42 of the pin would then be received in the same grooves in the end shields hole 28 formed by the bumps 62 and splines 64 adjacent the first end face 38 of the pin that passed through the hole previously. However, by circumferentially skewing the bumps 62 and splines 64 relative to each other, as the bumps 62 and splines 64 adjacent the second end face 42 of the pin pass into the end shields hole 28 they form their own grooves in the material of the end shield legs, thereby insuring a tight friction fit of the pin in the end shields hole 28. In a like manner, the bumps 62 and splines 64 adjacent the first end face 38 of the pin cut grooves into the material of the stator laminations 16 as they are pressed into the hole 32 of the stator, thus insuring a tight friction fit of the pin in the stator hole.

Figure 6:
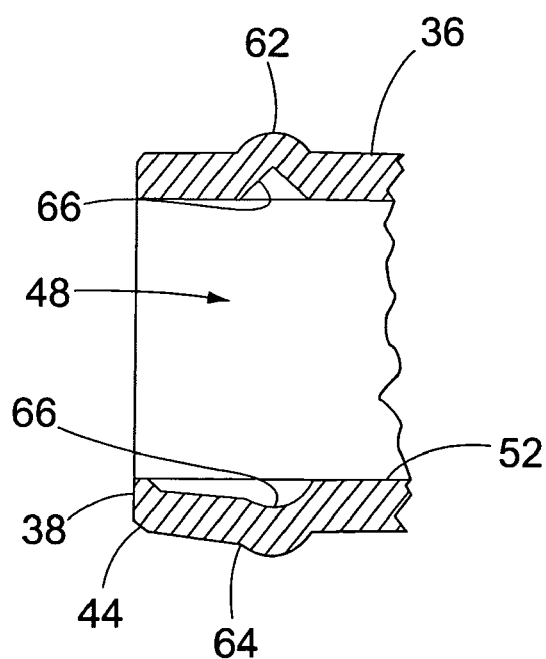

The partial cross section of FIG. 6 shows recesses 66 formed into the pin interior surface 52 behind each of the projections 62, 64. The recesses 66 allow the projections 62, 64 to easily compress or crush as the pin 34 is driven into the motor stator hole 32 and end shield hole 28.

The grounding pin of the invention described above is employed in basically the same manner as the prior art grounding pin. However, as explained earlier, because the opposite ends of the grounding pin of the invention are capable of contracting or collapsing radially inwardly independently of each other, the grounding pin provides a tight friction engagement of the pin with aligned holes of the end shields and the stator when the hole of the end shields is larger than that of the stator.

While the present invention has been described by reference a specific embodiment, it should be understood that modifications and variations of the invention may be constructed without departing from the scope of the invention defined in the following claims.

The invention claimed is:

1. A ground for grounding two separate pieces of an electrical device together, the ground comprising:
   a slender, elongate pin having a longitudinal length with opposite first and second ends, a cylindrical exterior surface between the first and second ends, and a slot that extends into the pin from the pin exterior surface and extends along the pin length between the pin first and second ends.
   the pin having a notch in the pin exterior surface and the notch traversing the slot.

2. A ground for grounding two separate pieces of an electrical device together, the ground comprising:
   a slender, elongate pin having a longitudinal length with opposite first and second ends, a cylindrical exterior surface between the first and second ends, and a slot that extends into the pin from the pin exterior surface and extends along the pin length between the pin first and second ends, the pin having a longitudinal center axis through a center of the pin, the slot extending to the center axis of the pin; and,
   the pin having a notch in the pin exterior surface and the notch traversing the slot and intersecting the center axis.

3. A ground for grounding two separate pieces of an electrical device together, the ground comprising:
   a slender, elongate pin having a longitudinal length with opposite first and second ends, a cylindrical exterior surface between the first and second ends, and a slot that extends into the pin from the pin exterior surface and extends along the pin length between the pin first and second ends;
   the pin having a center bore and an interior surface that extends around the center bore, the center bore extending through the length of the pin and intersecting the first and second ends of the pin, the slot intersecting the center bore; and,
   the pin having a notch in the exterior surface of the pin and the notch traversing the slot and intersecting the center bore.

4. A ground for grounding two separate pieces of an electrical device together, the ground comprising:
   a pin having a longitudinal length with opposite first and second ends, an exterior surface between the first and second ends, and a slot that extends into the pin from the pin exterior surface and extends along the pin length between the pin first and second ends;
   the pin having a plurality of bumps on the pin exterior surface, and the bumps being arranged in pairs of longitudinally spaced bumps at opposite ends of the pin exterior surface.

5. The ground of claim 4, further comprising:
   the pairs of longitudinally spaced bumps being misaligned axially on the exterior surface of the pin.

6. A ground for grounding two separate pieces of an electrical device together, the ground comprising:
   a pin having a longitudinal length with opposite first and second ends, an exterior surface between the first and second ends, and a slot that extends into the pin from the pin exterior surface and extends along the pin length between the pin first and second ends;
   the pin having a plurality of oblong splines that extend longitudinally across the pin exterior surface.

7. A ground for grounding together two separate pieces of an electrical device, the ground comprising:
   a pin having a longitudinal length with opposite first and second ends, an exterior surface between the first and second ends, and a lateral notch that extends into the pin from the pin exterior surface between the pin first and second ends; and,
   the pin having a plurality of longitudinally spaced bumps on the pin exterior surface.

8. The ground of claim 7, further comprising:
   the pin has a longitudinal center axis through a center of the pin, and the notch extends to the pin center axis.

9. The ground of claim 7, further comprising:
   the pin having a center bore that extends through the length of the pin and intersects the first and second ends of the pin, and the notch intersecting the center bore.

10. The ground of claim 9, further comprising:
    the pin having a slot in the pin exterior surface that extends along the length of the pin intersecting the first and second ends of the pin and the center bore.

11. A ground for grounding a first piece of an electrical device having a first hole therein to a second piece of an electrical device having a second hole therein, the ground comprising:
    a pin having a longitudinal length with opposite first and second ends, an exterior surface between the first and second ends and an interior surface that extends around a center bore of the pin, the first end of the pin being collapsible around the center bore when the first end of the pin is inserted into the first hole of the first piece of the electrical device, and the second end of the pin being collapsible around the center bore when the second end of the pin is inserted into the second hole of the second piece of the electrical device; and,
    the pin having a plurality of splines that extend longitudinally across the pin exterior surface.

12. The ground of claim 11, further comprising:
the pin having a notch in the exterior surface between the first and second ends of the pin and the notch intersecting the center bore.

13. The ground of claim 12, further comprising:
the center bore having a center axis and the notch intersecting the center axis.

14. A ground for grounding a first piece of an electrical device having a first hole therein to a second piece of an electrical device having a second hole therein, the ground comprising:
a pin having a longitudinal length with opposite first and second ends, an exterior surface between the first and second ends and an interior surface that extends around a center bore of the pin, the first end of the pin being collapsible around the center bore when the first end of the pin is inserted into the first hole of the first piece of the electrical device, and the second end of the pin being collapsible around the center bore when the second end of the pin is inserted into the second hole of the second piece of the electrical device; and, the pin having a plurality of bumps on the pin exterior surface.

15. The ground of claim 14, further comprising:
the plurality of bumps on the pin exterior surface being arranged in longitudinally spaced, axially misaligned pairs.

* * * * *